United States Patent [19]

MacKinnon

[11] Patent Number: 5,651,023
[45] Date of Patent: Jul. 22, 1997

[54] MONOLITHIC LASER

[75] Inventor: Neil MacKinnon, Ardrossan, Scotland

[73] Assignee: Uniphase Lasers Limited, Northants, United Kingdom

[21] Appl. No.: 517,330

[22] Filed: Aug. 21, 1995

[30] Foreign Application Priority Data

May 13, 1995 [GB] United Kingdom ............... 9509739

[51] Int. Cl.$^6$ ............................................... H01S 3/08
[52] U.S. Cl. .................... 372/107; 372/92; 372/22; 372/34; 372/105
[58] Field of Search ............................. 372/92, 21, 22, 372/36, 39, 97, 99, 98, 34, 107, 105

[56] References Cited

U.S. PATENT DOCUMENTS

| Re. 34,812 | 12/1994 | Zayhowski et al. | 372/97 |
|---|---|---|---|
| 4,791,631 | 12/1988 | Baumert et al. | 372/22 |
| 5,181,214 | 1/1993 | Berger et al. | 372/22 |
| 5,245,618 | 9/1993 | Masuda et al. | 372/22 |
| 5,247,528 | 9/1993 | Shinozaki et al. | 372/22 |
| 5,274,650 | 12/1993 | Amano | 372/22 |
| 5,295,146 | 3/1994 | Gavrilovic et al. | |
| 5,303,250 | 4/1994 | Masuda et al. | 372/92 |
| 5,315,433 | 5/1994 | Okazaki et al. | 372/22 |
| 5,341,388 | 8/1994 | Masuda et al. | 372/36 |
| 5,341,393 | 8/1994 | Okazaki et al. | |
| 5,377,212 | 12/1994 | Tatsuno et al. | |
| 5,379,311 | 1/1995 | McFarlane et al. | 372/39 |
| 5,381,431 | 1/1995 | Zayhowski | 372/99 |
| 5,588,014 | 12/1996 | Okazaki et al. | 372/22 |

FOREIGN PATENT DOCUMENTS

| 0 455 383 A3 | 11/1991 | European Pat. Off. | |
|---|---|---|---|
| 0523861A2 | 1/1993 | European Pat. Off. | 372/92 |
| 7099360 | 4/1995 | Japan. | |
| 2252867 | 8/1992 | United Kingdom. | |
| WO94/29937 | 12/1994 | WIPO. | |
| WO95/06345 | 3/1995 | WIPO. | |

OTHER PUBLICATIONS

MacKinnon, N. and Sinclair, B.D., "A laser diode array pumped, Nd:YVO$_4$/KTP, composite material microchip laser," Optics Communications 105 pp. 183–187 (1994).

Primary Examiner—Leon Scott, Jr.
Attorney, Agent, or Firm—Clifford W. Browning; Woodard, Emhardt, Naughton, Moriarty & McNett

[57] ABSTRACT

A laser comprising a laser cavity (13) having reflectors at each end of an optical path, a first layer of gain material (15) and a second layer of a second material (14, 16) disposed along the optical path, wherein the first and second layer are directly optically contacted to one another at associated faces. Also, a laser comprising a laser cavity having a layer of gain material (15), and second and third crystals (14,16) having anisotropic refractive indices disposed along an optical path, the laser being oscillatory in a preferred mode having a particular orientation of polarization, the second crystal (16) being oriented with respect to the path to cause no appreciable net depolarisation of the preferred mode, and the third crystal (14) being arranged such that the preferred mode is transmittable therethrough with minimal refraction.

19 Claims, 2 Drawing Sheets

MONOLITHIC LASER

TECHNICAL FIELD

This invention relates to lasers and particularly microchip lasers.

BACKGROUND ART

Microchip lasers generally comprise a diode pump source and an etalon of gain material forming a resonator cavity. Such lasers are very small but have high efficiency and high power density at the output. A composite microchip laser can have a frequency doubling material such as KTP optically linked by index matching materials to the gain material so as to produce a visible output. Typically a composite microchip laser has end coatings which are highly reflective at the desired fundamental frequency, and highly transmissive at other frequencies; this ensures that the gain at the fundamental frequency is maximised. For example the desired fundamental frequency may have a wavelength of 1064 nm and accordingly end coatings which are highly reflective at that frequency are provided. Laser light at other frequencies, for example those having wavelengths of 1340 nm and 916 nm, are allowed to escape from the resonator cavity by the use of highly transmissive end coatings.

By the use of a suitable non-linear material, the frequency of laser light from the gain material can be doubled, thereby halving the wavelength and producing an output which is visible. For example frequency doubling of laser light at 1064 nm results in an output at 532 nm, which is green and readily visible.

One problem in the manufacture of commercial composite microchip lasers is the reduction in optical losses at the junction between the gain material and frequency doubling material. Reflection losses and light scatter can be rather high at the junction which can be formed of matching fluid such as halo carbon oil.

Another problem in the manufacture of composite microchip lasers is to hold the gain material and frequency doubling material in register. This problem is made more difficult to solve because the component parts of the cavity are very small, the gain material typically having an area of only 3 mm square and a thickness of about 1 mm. Yet a further problem is to accurately hold the microchip laser on a mount or chassis relative to the diode pump source in such a manner that internal stresses are not induced in the resonator cavity due to e.g. thermal effects.

It has been proposed to use an organic material such as an oil between adjacent end faces of the gain material and frequency doubling material. Such a material can eliminate intra cavity voids and thereby reduce reflections. The material also provides good thermal contact between the materials. In the case of oil however, the surface tension effects may be insufficient to maintain the component parts in registration over an extended period of use, the change in registration resulting in lowered output power and increased noise.

It has also been proposed to hold the gain material and frequency doubling material together using an optical cement. Such an arrangement has good thermal conductivity and provides the necessary mechanical rigidity to maintain registration of the materials. However the very high power density of e.g. 10 MW/cm$^2$ at the fundamental wavelength is sufficient to degrade the cement over a period of time, leading to darkening of the cement and subsequent failure of the laser.

Neither of these assembly methods provides an effective solution to the problem of mounting the resonator cavity on a chassis. A mounting method should be reliable, repeatable and suitable for mass production techniques whilst not thermally isolating the laser or introducing additional parasitic losses which could reduce efficiency of the laser.

A further problem which has been identified in intra-cavity frequency doubled lasers is the existence of amplitude instabilities in the output, especially at high pump power. Amplitude instabilities in these lasers are the result of more than one axial mode oscillating within the resonator cavity. These axial modes may have various polarisations, and can couple together and produce chaotic amplitude fluctuations. In order to produce an intra-cavity frequency doubled laser with reliable, stable output amplitude it is necessary to constrain the laser to oscillate on one axial mode with a well defined polarisation state, and to inhibit oscillation on all other modes.

In the past this has been performed by inserting discrete frequency selection elements and polarisers within the cavity. These components are bulky, and consequently this conventional approach to wavelength discrimination in larger laser cavities cannot be applied to the monolithic format.

The problem of instabilities in intra-cavity doubled lasers is well known in the art and is known as "The Green Problem". These amplitude instabilities inhibit the application of green lasers to fields such as reprographics where green light, being a member of the most commonly employed set of additive primary colours, is used extensively in scanning across a photosensitive plate, amplitude modulation being used to create a desired pattern. Any random or periodic noise on the output of a green laser so used would give rise to "banding" on the image formed on the photosensitive plate, which is clearly undesirable.

DISCLOSURE OF INVENTION

The invention seeks to avoid or at least mitigate these problems of the prior art.

According to one aspect of the invention there is provided a laser comprising a laser cavity having reflectors at each end of an optical path, and a first layer of gain material and a second layer of a second material disposed along the optical path, wherein the first and second layer are directly optically contacted to one another at respective abutting faces.

The technique of optical contacting requires the components of the laser to have highly polished and clean optical surfaces such that on being pressed together the Van der Waals forces between adjacent molecules bond the materials together. A bond on this atomic scale is extremely robust and light will see only the Fresnel interaction between the two materials at the interface. Furthermore the technique ensures registration of the materials and provides good thermal transmissivity for the cavity, thus avoiding localised heating and/or expansion of components which might affect their operating properties.

Typically the adjacent end faces should have a relative taper better than 0.25 milliradians and be substantially free of scratches greater than 10 μm in size and pits greater than 5 μm in size.

The second layer can be a mount which may be for example formed of an appropriately oriented crystal of quartz or undoped YAG and thus compatible with the gain material and in a preferred embodiment also with a third layer such as a frequency doubling material. Preferably, the mount is optically contacted both to the gain material and a frequency doubling material, and thus disposed between the two, but other relative arangements of these three layers are possible.

An optically passive material of the kind which can be used for the mount has no substantial effect on the laser. It can be durable and inexpensive, and thus be machined according to the mounting requirements. Furthermore the size of the layer of gain material and frequency doubling crystal can be reduced to a minimum since the optical contacting technique frees those components from structural mounting considerations. In other words, the properties of the laser can be optimised for production of laser light and without regard to mechanical requirements of assembly and alignment within the overall laser assembly. The mount can be used for handling of the laser during assembly and subsequently thus minimising the possibility of any damage to optical components for example.

The use of a mount also provides a path for heat conduction to a chassis of the laser, which path can be controlled by use of e.g. a thermo-electric cooler to provide heat sinking of the device.

Optical contacting ensures that the gain material and frequency doubling material are attached via end faces only thus ensuring that thermally induced expansion and contraction does not result in internal stresses within the laser cavity itself. Furthermore there is no intra cavity material such as oil or cement which could degrade or otherwise affect operation of the laser either due to operation or due to time.

The mount may be placed on either end of a composite laser consisting of a crystal of gain material and a crystal of frequency doubling material, a reflector being provided either on the inner or on the outer face of the mount. Preferably however the mount is provided between the gain material and the frequency doubling material.

The mount can be of any convenient size and shape, and because the material of the mount is relatively inexpensive it can be sufficiently large to be handled by normal assembly techniques.

The mount is preferably of a material which is capable of receiving a high degree of mechanical finishing thereby to ensure a highly polished surface. The material of the mount can be optimised for surface finish in a manner which may not be practicable for other components of the laser due to their inherent physical properties and fragility. A very smooth and flat surface for the mount may compensate for a slightly less smooth and flat surface of the gain material or frequency doubling material whilst still permitting a high degree of optical contacting.

The mount is preferably very thin commensurate with the required degree of durability and rigidity.

In the case where the mount is an end component of the laser, the outer surface may be shaped in the manner of a lens to better focus the laser light and define more strongly the resonator mode.

Beneficially, the mount and gain material can first be optically contacted prior to coating an end face of the layer of gain material with a suitable reflective coating thus avoiding any problems of warping of the relatively thin crystal of gain material during coating.

Also the optically contacted layers can be attached to one another by an outer layer of bonding such as by a layer of adhesive. The adhesive can be applied to outer edges of the gain material and/or a face of the second layer such as a relatively larger mount.

In order to avoid amplitude stability problems, another aspect of the invention provides a laser comprising a laser cavity having an layer of gain material, and second and third crystals having anisotropic refractive indices disposed along an optical path, the laser being oscillatory in a preferred mode having a particular orientation of polarisation, the second crystal being oriented with respect to the optical path to cause no appreciable net depolarisation of the preferred mode, and the third crystal being arranged such that the preferred mode is transmittable therethrough with minimal refraction. Preferably two or more of the layers in the laser cavity are directly optically contacted acording to the previous aspect of the invention.

The second crystal having an anisotropic refractive index, which is preferably, though not exclusively, a frequency doubling crystal with a type II doubling geometry, depolarises the linearly polarised light through an angle $\delta$ given by the following equation:

$$\delta = (2\Pi(\Delta n))L/\lambda \qquad (1)$$

where $\Delta n$ is the birefringence of the frequency doubling crystal, L is the length thereof and $\lambda$ is the wavelength of the incident light.

If $\delta$ is $m\Pi$ radians, where m is an integer, then the depolarisation by the frequency doubling crystal has a net zero effect and the light comes out of the material unaltered in polarisation state. If $\delta$ is $(2m-1)\Pi/2$ radians then the transmitted light is linearly polarised but along a direction orthogonal to the input polarisation. A value anywhere in between these values indicates an elliptical polarisation. It is important to note at this point that the depolarisation by the frequency doubling crystal is linearly proportional to crystal length and, more importantly, inversely proportional to wavelength as set out in equation (1). It is possible therefore by controlling the length of the frequency doubling crystal accurately, by temperature tuning, to ensure that one preferred wavelength emerges from the frequency doubling crystal unaltered in polarisation state while rays with other wavelengths emerge depolarised by an amount given by the above equation.

The present invention uses this selective depolarisation effect. The uniaxial or biaxial birefringent crystal is arranged such that the preferred mode, which has substantially zero net depolarisation after a double pass through the frequency doubling crystal or other depolarising material, is polarised in the particular plane which is not deviated according to the birefringent properties of the crystal. In contrast, any unwanted modes of other wavelengths which exist in the laser will be depolarised to a different extent and consequently will be deviated by the birefringent crystal, and will consequently see a cavity structure tending towards geometric instability.

Preferably the monolithic laser comprises a mount, on which the gain material and the frequency doubling crystal are mounted. The gain material and the frequency doubling crystal may be optically contacted to the mount without the presence of intra-cavity materials to provide a monolithic structure as previously described.

The mount may be of crystal quartz material. This is well known for its uniaxial birefringent properties and accordingly by orienting the crystalline structure appropriately the mount can act in a suitable manner for frequency selection and amplitude stabilising purposes.

Other features of the invention will be apparent from the following description of a preferred embodiment illustrated by way of example in the accompanying drawings.

5

BEST MODE OF CARRYING OUT INVENTION

Figure 1:
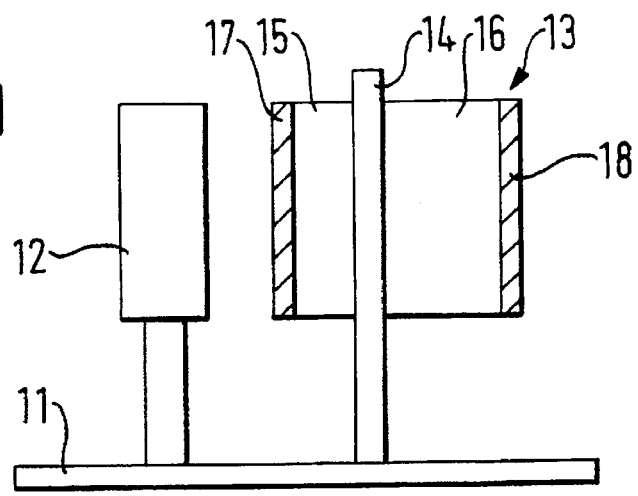
FIG. 1 illustrates one embodiment of a microchip laser according to the present invention.

With reference to the drawings a schematic representation of a monolithic microchip laser is illustrated in FIG. 1. A chassis 11 has mounted thereon in any suitable manner a diode pump 12. The pump may for example be a conventional AlGaAs source having a power output of approximately 650 mW at a wavelength of 809 nm. The active area of such a diode pump is typically 50–100 µm×1 µm.

A microchip laser cavity 13 comprises a mount 14 of crystal quartz or undoped YAG, an etalon of gain material 15 and a crystal of frequency doubling material 16. In these embodiments the mount is optically passive and thus the crystalline structure of the crystal such as quartz is oriented so that the optical path propagates along a principal crystal axis if it is birefringent. In the case of undoped YAG, which is an isotropic material, orientation is not important. The gain material may for example be a crystal of Nd:YVO$_4$ and the frequency doubling material may be a crystal of KTP non-linear material. Each end of the laser carries a coating 17,18 which may be any suitable combination of highly reflective and highly transmissive coatings according to the desired wavelength of the laser output.

The chassis, pump and laser cavity are illustrated in a representative manner only, the precise sizes, thicknesses and spacing of the components being chosen according to well known criteria. An optical element may be included between the pump 12 and the laser cavity 13 in order to focus the pump output in a desired manner.

The contact surfaces of the crystals 15 and 16 and of the mount 14 are highly polished and flat so as to ensure that when pressed together, the Van der Waals forces bond the materials together. Prior to bonding, the materials are placed in registration with one another. Other optical components may be bonded to the composite structure.

The mount 14 extends on at least one side so as to provide means of securing the laser cavity to the chassis 11 in any suitable manner. The mount can be sufficiently large so as to ensure handling thereof in any conventional manner, and furthermore may include a conventional thermo-electric cooler to ensure that the temperature of the laser is maintained within a desired range.

For example the cooler can comprise a Peltier device and a thermistor for providing feedback thereby to regulate the temperature. Typically, regulation within the range 20° to 40° C. is desirable to a stability of about 0.1° C.

Figure 2:
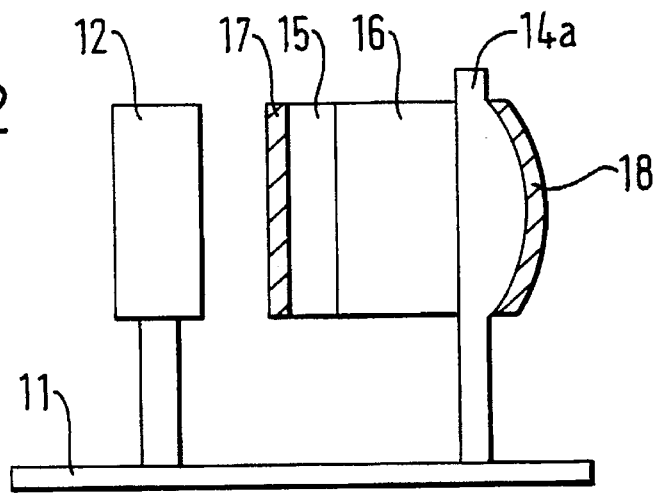
FIG. 2 illustrates a second embodiment of the invention.

An alternative form of the invention is illustrated schematically in FIG. 2. In this case the gain material 15 and frequency doubling material are optically contacted to each other, and the mount 14a is provided at the output end as

Figure 3:
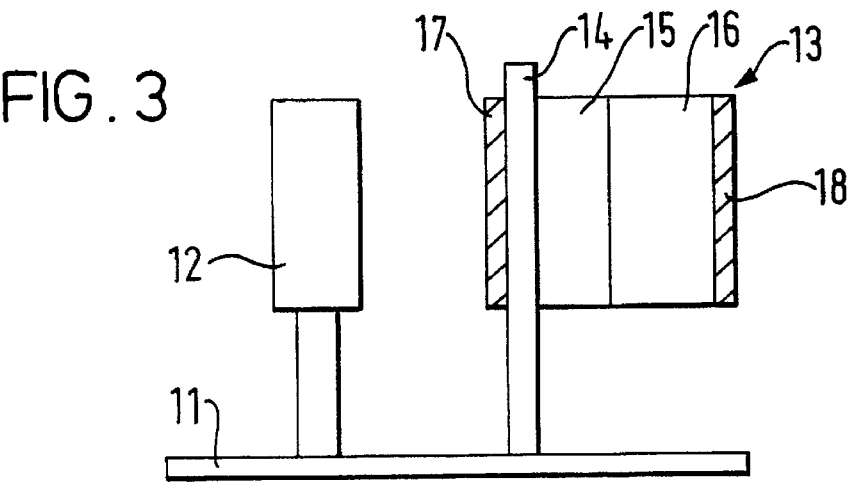
FIG. 3 illustrates a third embodiment of the invention.

6 illustrated. The output face of the mount 14a is machined to form a convex lens for the laser cavity. The coating 18 could alternatively be between the coating material and the mount 14a. The lens can be of any suitable or desirable shape to improve the efficiency of the laser by reducing the waist of the laser beam. A third embodiment is shown in FIG. 3 wherein the mount is shown in front of the gain material.

Figure 4:
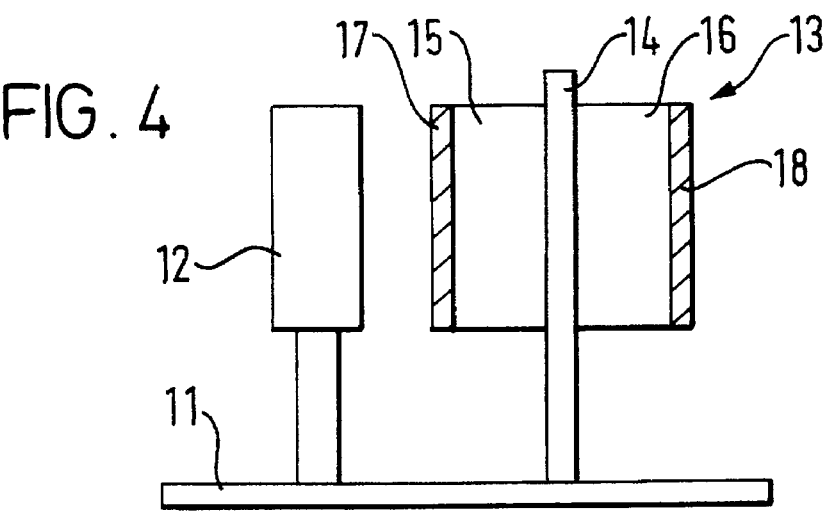
FIG. 4 is a schematic side view of a fourth composite microchip laser according to the invention.

A fourth microchip laser is illustrated in FIG. 4. A chassis 11 has mounted thereon in any suitable manner a diode pump 12. The pump may for example be a conventional AlGaAs source having a power output of approximately 650 mW at a wavelength of 809 nm. The active area of such a diode pump is typically 50–100 µm×1 µm.

A microchip laser cavity 13 comprises a mount 14 of crystal quartz, a layer of gain material 15 and a crystal of frequency doubling material 16. The gain material may for example be a crystal of Nd:YVO$_4$ and the frequency doubling material may be a crystal of KTP non-linear material. Each end of the laser carries a coating 17,18 which may be any suitable combination of highly reflective and highly transmissive coatings according to the desired wavelength of the laser output.

The chassis, pump and laser cavity are illustrated in a representative manner only, the precise sizes, thicknesses and spacing of the components being chosen according to well known criteria. An optical element may be included between the pump 12 and the laser cavity 13 in order to focus the pump output in a desired manner.

The contact surfaces of the crystals 15 and 16 and of the mount 14 are highly polished and flat so as to ensure that when pressed together, the Van der Waals forces bond the materials together. Prior to contacting, the materials are placed in registration with one another and a small force which can be achieved by hand is applied along the direction of the optical path to effect contacting. There is thus created a monolithic structure comprising two regions of different material. Other optical components may be contacted or bonded to the composite structure.

The mount 14 extends on at least one side so as to provide means of securing the laser cavity to the chassis 11 in any suitable manner. The mount can be sufficiently large so as to ensure handling thereof in any conventional manner, and furthermore may include a conventional thermo-electric cooler to ensure that the temperature of the laser is maintained within a desired range.

The quartz mount 14 is uniaxially birefringent, as described above and suitably oriented as shown in FIGS. 5 to 7. Referring to FIGS. 4–7, the refractive indices along X and Y are equivalent, and it is only along Z that the index is different. The direction of propagation of light along axis P is approximately 45° to the Y and Z axes. For a light ray polarised parallel to the X axis and entering the mount 14 at 45° to the Y and Z axes the ray is undeviated. A ray entering the mount 14 at 45° to the Y and Z axes but polarised orthogonally to the X axis will be deviated from its path by an angle Θ in the YZ plane.

The angle Θ may be given by the following equation $$\tan \Theta = (b^2 - c^2)/(b^2 + c^2) \tag{2}$$

Where b is the refractive index of the material for a ray polarised along the Y axis and c is the refractive index of the material as seen by a ray polarised along the Z axis. The difference between these two refractive indices (i.e. between b and c) is a measure of the birefringence of the material.

For rays with a polarisation between 0° and 90° the amount of deviation from the direction of incidence is given by $$\Theta^* = \Theta(\sin(\rho)) \quad (3)$$

Where ρ is the angle between the polarisation direction of the incident radiation and the X axis. Clearly from the above equation the deviation is at a maximum where ρ is 90° and at a minimum where ρ is 0 degrees.

The microchip laser as described with reference to FIG. 1 is a plano/plano design which clearly is inherently sensitive to the initial alignment of the cavity defining mirrors.

Figure 5:
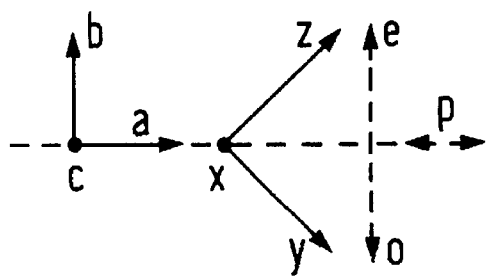
FIG. 5 is a schematic plan view of the laser of FIG. 4 showing the orientation of the crystallographic axes of the component crystals of the laser.
Figure 6:
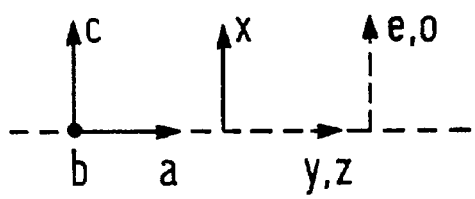
FIG. 6 is a schematic side view of the crystallographic axes of the laser shown in FIG. 4.
Figure 7:
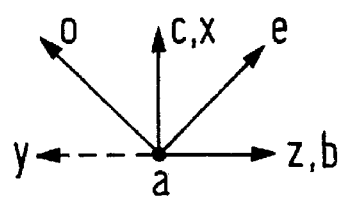
FIG. 7 is a schematic view in the lasing direction of the crystallographic axes of the laser shown in FIG. 4

In FIGS. 5–7, a,b,c are the axes of the gain material, X, Y and Z are the axes of the crystal quartz mount 14 and e and o are the axes of the frequency doubling material 16. By temperature tuning the length of the device it is possible to select a "most favoured" axial mode. That is, one which returns through its double pass through the frequency doubling material 16 unaltered in polarisation state and enters the crystal quartz mount 14 polarised along the crystal quartz X axis. This most favoured mode will see no deviation from its path within the mount. If the component parts of the device are fabricated to the correct tolerances then this "most favoured" axial mode will oscillate within a geometrically stable microresonator. It is however important to ensure that the c-axis of gain material 15 is aligned with the X axis of the mount 14 as shown. This ensures that the "most favoured" axial mode will extract optical gain from the high gain polarisation direction in the gain material 15. Other axial modes with a finite wavelength separation from the "most favoured" will return from the frequency doubling crystal 16 with a polarisation state determined by equation (1) and quite unlike that of this "most favoured" mode. These other axial modes will consequently be deviated from their path by the action of the crystal quartz mount 14 and these modes will "see" a microresonator structure tending towards geometric instability. Clearly using different spacer materials, with different amounts of birefringence, the amount of discrimination between modes may be selected according to the configuration of the device and its intended operating parameters. For example greater amounts of discrimination between axial modes may be achieved by substituting crystal quartz with lithium niobate (LiNbO$_3$) in the same crystallographic orientation. For LiNbO$_3$ the walk-off between modes of orthogonal polarisation would be, as given by equation (2), 30 mrad. The greater discrimination provided by this material would allow for increased excitation levels and higher power single polarisation/frequency mode operation from the device. In addition to providing wavelength and polarisation discrimination between modes the mount provides a surface for optical contacting of both components and a "chassis" around which to build and heatsink the device.

The initial alignment of the cavity mirrors is normally desired to be as good as possible otherwise the laser will not operate. It has been observed experimentally that an initial wedge angle of 0.6 mrad between the cavity defining mirrors is sufficient to suppress oscillation within the microresonator. According to the equations (2) and (3) above, the walk-off angle, Θ, between the optimally polarised ray and the "worst case" ray is calculated to be 5.7 mrad for crystal quartz. This is almost ten times the effective mirror misalignment required to inhibit lasing. Consequently crystal quartz mount 14 of the orientation described above and placed within the microresonator will act effectively as an intra-cavity polariser preventing lasing in a specific polarisation orientation.

In a further embodiment of a laser according to the invention, the laser cavity comprises a gain material and a Type 1 frequency doubling material which does not exhibit the depolarising properties of the frequency doubling materials referred to above. Accordingly, it is necessary to provide an additional layer of material which exhibits the mode selection properties which depolarise frequencies or modes other than the preferred mode. Of course, it is still necessary to provide the descriminating element which, as described above, can be a layer of material which refracts all frequencies or modes other than the preferred mode which, having passed through the depolarising layer substantially unaffected, is similarly not substantially deviated from the optical path by the discriminating layer which can be and appropriately oriented refractive material as described above.

Additionally, it is possible to construct a laser according to the invention comprising only two layers within the laser cavity which are optically contacted. Such a laser can, for example, comprise a gain material and a mount. Such a laser would therefore lase only at the laser frequency of the gain material. Accordingly, it is possible to provide an infra-red laser according to the invention.

What is claimed is:

1. A microchip laser comprising a laser cavity having reflectors at each end of an optical path, a first layer of gain material, and a second layer of a frequency doubling material and a third layer of a third optical material, all disposed along the optical path, wherein each layer comprises one or two contact surfaces and the first, second and third layers are arranged along the optical path and each is directly optically contacted to an adjacent layer at associated contact surfaces, and wherein the third layer forms a mount extending to one side of the laser cavity.

2. A laser according to claim 1 wherein the layer of mount material comprises an optically passive material such as appropriately oriented crystal of quartz or undoped YAG.

3. A laser according to claim 1 wherein the layer of mount material comprises an optically active material such as a polarisation discriminator.

4. A laser according to claim 3 wherein the active material is an anisotropic material such as LiNbO$_4$ or quartz.

5. A laser according to claim 1 wherein the second layer comprises a KTP.

6. A laser according to claim 1 wherein the respective associated faces of each of the layers have a relative taper better than 0.25 milliradians and are substantially free of scratches greater than 10 μm in size and pits greater than 5 μm in size.

7. A laser according to claim 1 wherein a mount is positioned on either end of a composite laser cavity consisting of a crystal of gain material and a crystal of frequency doubling material, and a reflector provided either on the inner or on the outer face of the mount in the optical path of the laser cavity.

8. A laser according to claim 7 wherein when the mount is an end component of the laser cavity, the outer surface thereof is shaped in the manner of a lens to better focus the laser light.

9. A laser according to claim 1 comprising a laser cavity having a layer of gain material, and second and third crystals having anisotropic refractive indices disposed along an optical path, the laser being oscillatory in a preferred mode having a particular orientation of polarisation, the second crystal being oriented with respect to the optical path to cause no appreciable net depolarisation of the preferred mode, and the third crystal being arranged such that the preferred mode is transmittable therethrough with minimal refraction.

10. A laser according to claim 9 wherein the second crystal has an anisotropic refractive index, and is preferably a frequency doubling crystal.

11. A laser according to claim 10 comprising a third crystal comprising uniaxial birefringent crystal which is arranged such that the preferred mode, which has substantially zero net depolarisation after a passing through the frequency doubling crystal, is polarised in the particular plane which is not deviated according to the birefringent properties of the crystal.

12. A laser according to claim 9 comprising temperature control means for regulating the operative temperature of at least one component of the laser cavity.

13. A laser according to claim 9 wherein the laser cavity comprises a mount, on which the gain material and the so set depolarisation of preferred mode crystal or frequency doubling crystal are mounted, preferably by optically contacting.

14. A laser according to claim 13 wherein the mount is a uniaxial birefringent material such as quartz material.

15. A laser according to claim 9 comprising four layers of material along the optical path with the laser cavity, wherein one layer comprises gain material, a second layer comprises frequency doubling material, a third layer comprises a selective depolarisation material, and a fourth layer comprises a depolarisation discriminator material.

16. A laser according to claim 15 wherein the frequency doubling material is a Type I material.

17. A method of forming a microchip laser comprising a laser cavity having reflectors at each end of an optical path, a first layer of gain material and a second layer of a frequency doubling material and a third layer of third optical material, all disposed along the optical path, wherein each layer comprises one or two contact surfaces and the first, second and third layers are arranged along the optical path and each is directly optically contacted to an adjacent layer at associated contact surfaces, and wherein the third layer forms a mount extending to one side of the laser cavity wherein the second layer and the layer of gain material are first optically contacted prior to coating an end face of the layer of gain material with a suitable reflective coating.

18. A method of forming a laser cavity according to claim 17 wherein the optically contacted layers are also attached to one another by an outer layer of bonding such as by a layer of adhesive.

19. A method according to claim 18 wherein the bonding is applied to outer edges of the gain material and/or a face of the second layer such as a relatively larger mount.

* * * * *